J. G. GRANBERG.
ZINC KETTLE.
APPLICATION FILED MAR. 11, 1918.

1,298,692.

Patented Apr. 1, 1919.
2 SHEETS—SHEET 1.

INVENTOR.
John G. Granberg
BY
Edward E. Lingan
ATTORNEY.

J. G. GRANBERG.
ZINC KETTLE.
APPLICATION FILED MAR. 11, 1918.
1,298,692.
Patented Apr. 1, 1919.
2 SHEETS—SHEET 2.
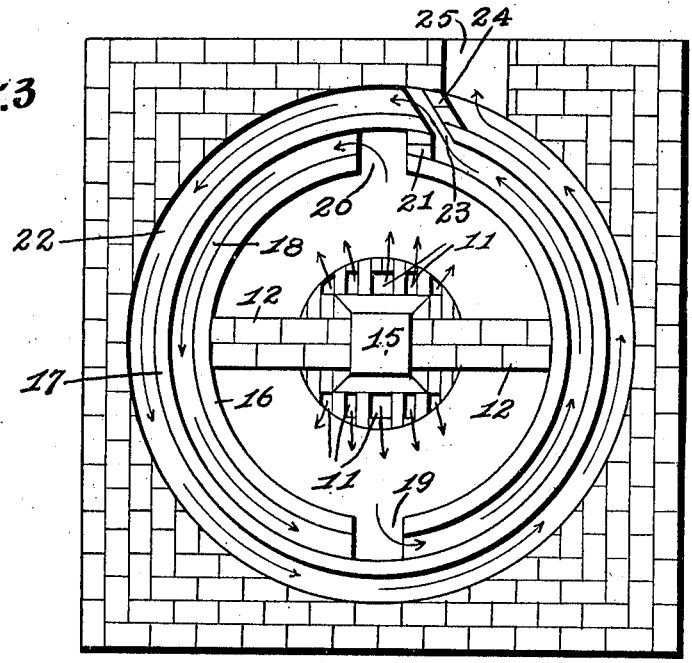
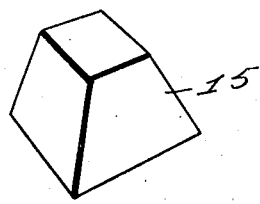
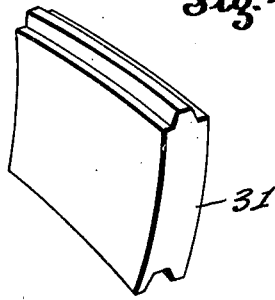
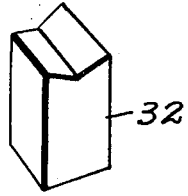
INVENTOR.
John G. Granberg
BY
Edward E. Frugan
ATTORNEY.

UNITED STATES PATENT OFFICE.

JOHN G. GRANBERG, OF BECKEMEYER, ILLINOIS.

ZINC-KETTLE.

1,298,692.  Specification of Letters Patent.  Patented Apr. 1, 1919.

Application filed March 11, 1918. Serial No. 221,679.

*To all whom it may concern:*

Be it known that I, JOHN G. GRANBERG, a citizen of the United States, and resident of Beckemeyer, Illinois, have invented certain new and useful Improvements in Zinc-Kettles, of which the following is a specification containing a full, clear, and exact description, reference being had to the accompanying drawings, forming a part thereof.

My invention relates to new and useful improvements in zinc kettles, and has for its special object the manufacture of a sectional kettle, formed out of ceramic material, and one that can be fired from the bottom, thus making it possible for the application of a great amount of heat.

In the drawings,

Fig. 3 is a top plan view of the supporting brick work with the kettle removed, the arrows showing the direction of travel and circulation of heat around the kettle.

Fig. 4 is a detailed perspective of one of the blocks or ceramic sections out of which the kettle is formed.

Fig. 5 is a detailed perspective view of a block or section which answers as a support for the bottom of the kettle, and Fig. 6 is a perspective view of one of the supporting bricks for the kettle.

Figure 1:
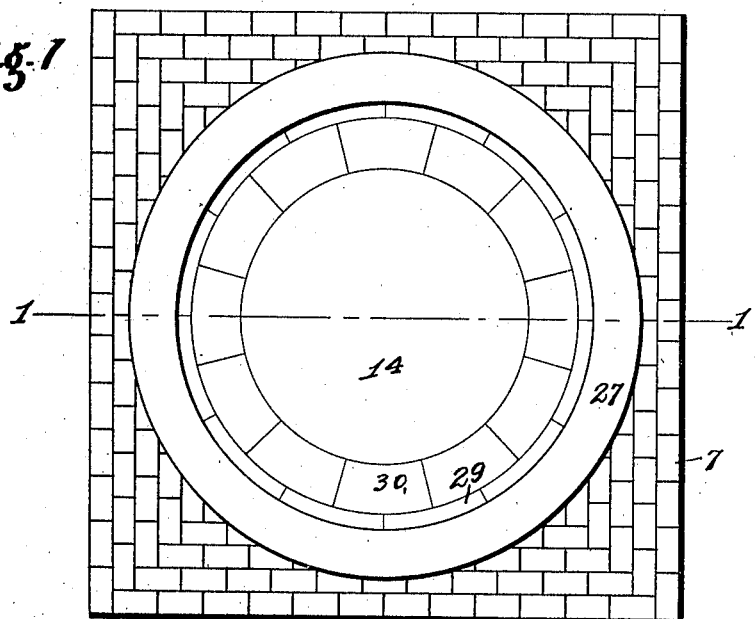
Figure 1 is a top plan view of my improved kettle.
Figure 2:
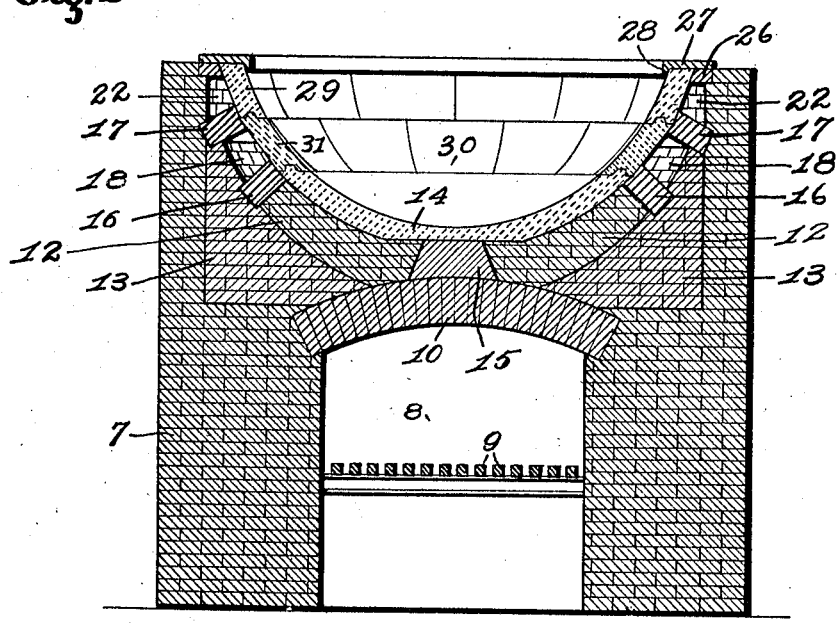
Fig. 2 is a transverse section taken on a line 1—1 of Fig. 1.

Referring to the drawings, 7 indicates the brick walls of the supporting structure for the kettle, lined with brick, 8 indicates the combustion chamber and 9 the grate bars. Spanning the combustion chamber 8 is an arch 10, in which arch are formed checkered openings 11, for the products of combustion arising from the combustion chamber.

12 indicates a division wall which extends transversely across the bottom of the kettle, said wall being supported on the arch 10, and the fire brick filling 13. The purpose of this wall is to, as it were, divide the heat arising from the combustion chamber, and also forms a partial support for the bottom section 14 of the kettle, the bottom section being supported in the center by the block or section 15.

Formed around the fire brick filling 13 is a circular row of supporting blocks 16, against the lower face of which the division wall 12 abuts, and spaced apart from the circular row of bricks or blocks 16 is a similar circular row of blocks 17. The space between the rows 16 and 17 form a heat passage 18.

Formed in the circular row of blocks 16 are openings 19 and 20 through which the heat passes upwardly from the arch of the furnace into the heat passage 18.

It will be observed that the passage 18 is closed adjacent the opening 20 by means of a division wall 21 which prevents the heat passing through the opening 20 from passing directly into the heat passage 22, without first circulating around the entire passage 18.

In the row of bricks 17 and directly adjacent the wall 21, I provide an opening 23 which allows the heat passing through the openings 19 and 20 to pass into the passage 22. This passage 22 is also closed off adjacent the opening 23 by a wall 24. The object of this wall is to prevent the direct outlet of heat into the flue 25, but acts as a deflector and causes all of the heat to circulate entirely around the upper section of the kettle before escaping into the chimney or flue.

In Fig. 3 I have illustrated by arrows the direction of travel of the heat from the combustion chamber 8, which is as follows:

Heat generated in the combustion chamber 8 passes upwardly through the checkered openings 11, and is divided by the wall 12, part of the heat passing on each side of said wall. The heat then strikes the circular row 16, and then passes through the openings 19 and 20 formed in said circular row of blocks. The heat passing through both of these openings then travels through the passage 18, striking the wall 21 which deflects it through the opening 23, into the passage 22, whence it circulates entirely around this passage until it strikes the wall 24, whence it is deflected out through the flue or chimney 25.

By this means I get a constant whirlpool action of heat around the kettle, the heat always traveling in the same direction until its final ejection from the furnace into the chimney.

The top wall of the passage 22 is formed by a circular row of fire bricks 26, which are mounted on the wall 7, and mounted on the wall 7 and on the bricks 26 is a circular metallic ring 27 provided with a depending flange 28. Between the fire bricks 26 and the depending flange 28 the top section 29 of the kettle is located, the object of the ring 27 being to hold the top section 29 of the kettle in place, and also prevent the same from being chipped in charging the kettle.

The kettle proper is formed of a bottom section 14, an intermediate section 30 and a top section 29, the sections 29 and 30 being formed of tongue and groove blocks 31 as illustrated in Fig. 4. The rings 16 and 17 are necessary as a support for the kettle proper, and are formed of a series of blocks 32 as illustrated in Fig. 6, the rows 16 and 17 being placed at the horizontal joints of the kettle.

It will thus be seen that I have provided a zinc kettle formed of ceramic sections with no metal exposed at the point of firing.

Heretofore in melting zinc, iron kettles have been employed and as the zinc attacks the iron, the life of such kettles has been of short duration. Then again, in such kettles, the amount of iron that is eaten up by the zinc produces a waste of the zinc, in a form of zinc dross.

In the kettles which have been previously used, where brick was used in the construction, an iron frame or shell was used on which the brick was supported. In this type of kettle it was impossible to fire the kettle from below, on account of the iron shell, necessitating the firing of the kettle from above, in which cases a considerable amount of zinc was burnt, in the form of zinc oxid.

By my improved construction of kettle I am enabled to fire the same from the bottom, the same as the old cast iron kettles, thus eliminating all zinc dross from the melting zinc, and furthermore I am enabled to maintain a greater application of heat to the kettle, this arising from the fact that the entire kettle is constructed of ceramic material, and the supports on which it rests are constructed of the same material, and by the whirlpool circulation of heat around the kettle.

Having fully described my invention, what I claim is:

1. A zinc kettle comprising a supporting wall, a combustion chamber, an arch provided with openings positioned above the combustion chamber, a division wall mounted on said arch, two circular rows of supporting walls, having a heat passage between them, mounted above said arch, and a receptacle of ceramic material mounted on said supporting walls.

2. A zinc kettle comprising a series of sections formed of interlocking ceramic blocks, one section being superimposed on the other section, a series of circular walls formed of ceramic blocks for supporting said section, and a metallic circular ring for holding the blocks of the upper section in their proper position.

3. A zinc kettle comprising a dish shaped bottom section made out of ceramic material, a top section composed of a series of interlocking tongue and groove sections, an intermediate section likewise composed of a series of tongue and groove sections, the top, intermediate and bottom sections when assembled forming a bowl shaped kettle, a metallic ring provided with a depending flange mounted on the top edge of the top section, and a support for said assembled section comprising a series of circular walls spaced apart and formed of fire proof material, and a support for said circular walls.

4. A zinc kettle comprising a brick frame work, a combustion chamber, an arch provided with checkered openings above said combustion chamber, a supporting fire proof block mounted on said arch, a wall mounted on said arch intersecting the checkered portion of the arch, circular division walls carried by the outer walls, a bowl shaped receptacle composed of a series of interlocking ceramic blocks mounted on said circular walls, the said lower circular wall being provided with diametrically composed openings for the passage of heat, and a metallic ring mounted on the top edge of said bowl shaped receptacle.

In testimony whereof, I have signed my name to this specification, in presence of two subscribing witnesses.

JOHN G. GRANBERG.

Witnesses:
S. PFEIFFER,
W. C. STEIN.

Copies of this patent may be obtained for five cents each, by addressing the "Commissioner of Patents, Washington, D. C."